United States Patent
Ameigeiras Gutierrez et al.

(10) Patent No.: US 9,565,697 B2
(45) Date of Patent: Feb. 7, 2017

(54) METHOD AND A SYSTEM FOR SCHEDULING THE DOWNLINK IN LONG TERM EVOLUTION (LTE) NETWORKS BASED ON QUALITY OF SERVICE (QOS)

(71) Applicant: Telefonica, S.A., Madrid (ES)

(72) Inventors: Pablo Ameigeiras Gutierrez, Madrid (ES); Jorge Navarro Ortiz, Madrid (ES); Juan Manuel Lopez Soler, Madrid (ES); Raquel Garcia Perez, Madrid (ES); Quiliano Perez Tarrero, Madrid (ES); Javier Lorca Hernando, Madrid (ES)

(73) Assignee: Telefonica, S.A., Madrid (ES)

(*) Notice: Subject to any disclaimer, the term of this patent is extended or adjusted under 35 U.S.C. 154(b) by 325 days.

(21) Appl. No.: 14/381,459

(22) PCT Filed: Feb. 20, 2013

(86) PCT No.: PCT/EP2013/053324
§ 371 (c)(1),
(2) Date: Aug. 27, 2014

(87) PCT Pub. No.: WO2013/127665
PCT Pub. Date: Sep. 6, 2013

(65) Prior Publication Data
US 2015/0131545 A1 May 14, 2015

(30) Foreign Application Priority Data

Feb. 28, 2012 (ES) .................................. 201230296

(51) Int. Cl.
*H04W 72/12* (2009.01)
*H04W 72/08* (2009.01)

(52) U.S. Cl.
CPC ....... *H04W 72/1289* (2013.01); *H04W 72/087* (2013.01); *H04W 72/1236* (2013.01)

(58) Field of Classification Search
CPC .................... H04W 72/1289; H04W 72/1236; H04W 72/087
See application file for complete search history.

(56) References Cited

U.S. PATENT DOCUMENTS

| | | | |
|---|---|---|---|
| 7,729,376 B2 * | 6/2010 | Klausberger | H04L 47/10 370/400 |
| 2003/0104817 A1 | 6/2003 | Damnjanovic | |

(Continued)

FOREIGN PATENT DOCUMENTS

| WO | WO 2009096982 A1 * | 8/2009 | ............. H04W 28/24 |
|---|---|---|---|
| WO | WO 2011050540 A1 * | 5/2011 | ........... H04L 43/026 |

OTHER PUBLICATIONS

3GPP TS 23.203 V8.1.1 (Mar. 2008), 3rd Generation Partnership Project; Technical Specification Group Services and System Aspects; Policy and charging control architecture (Release 8).*

(Continued)

*Primary Examiner* — Andrew Lai
*Assistant Examiner* — Hoyet H Andrews, III
(74) *Attorney, Agent, or Firm* — Sughrue Mion, PLLC

(57) ABSTRACT

The method includes: performing a packet scheduling for a plurality of user terminals (UEs) based on information regarding QoS classes, the information regarding QoS classes is included in QoS class identifiers received from an Evolved Packet Core providing communication services to the user terminals. The method further includes receiving channel quality indicators from the plurality of user terminals and performing the scheduling also on the basis of the received channel quality indicators. The system of the invention is arranged to implement the method of the invention.

16 Claims, 7 Drawing Sheets

(56) References Cited

U.S. PATENT DOCUMENTS

| | | | | |
|---|---|---|---|---|
| 2007/0230335 | A1* | 10/2007 | Sang | H04L 12/5695 370/230 |
| 2007/0297360 | A1* | 12/2007 | Joachim | H04W 52/50 370/329 |
| 2008/0123660 | A1* | 5/2008 | Sammour | H04L 47/10 370/395.21 |
| 2008/0225725 | A1* | 9/2008 | Wang | H04L 47/10 370/235.1 |
| 2009/0052384 | A1* | 2/2009 | Zisimopoulous | H04L 47/14 370/329 |
| 2009/0252049 | A1* | 10/2009 | Ludwig | H04W 28/24 370/252 |
| 2009/0268684 | A1* | 10/2009 | Lott | H04W 72/087 370/329 |
| 2010/0067400 | A1* | 3/2010 | Dolganow | H04W 72/1236 370/253 |
| 2010/0153555 | A1* | 6/2010 | Majmundar | H04L 41/50 709/226 |
| 2010/0254480 | A1* | 10/2010 | Park | H04L 49/90 375/295 |
| 2010/0296474 | A1* | 11/2010 | Noriega | H04L 47/10 370/329 |
| 2010/0318661 | A1* | 12/2010 | Heurguier | H04L 12/5695 709/226 |
| 2011/0032834 | A1* | 2/2011 | Kim | H04W 72/087 370/252 |
| 2011/0149879 | A1* | 6/2011 | Noriega | H04W 72/1236 370/329 |
| 2011/0158182 | A1* | 6/2011 | Biton | H04W 72/1236 370/329 |
| 2011/0158184 | A1* | 6/2011 | Agulnik | H04W 28/18 370/329 |
| 2011/0199900 | A1* | 8/2011 | Ludwig | H04L 41/0893 370/230.1 |
| 2011/0222399 | A1* | 9/2011 | Shi | H04W 28/18 370/230 |
| 2011/0222406 | A1* | 9/2011 | Persson | H04L 47/12 370/236 |
| 2012/0014251 | A1* | 1/2012 | Arnott | H04L 5/0007 370/232 |
| 2012/0044850 | A1* | 2/2012 | Wang | H04W 72/005 370/312 |
| 2012/0044878 | A1* | 2/2012 | Ratasuk | H04W 74/0866 370/329 |
| 2012/0155282 | A1* | 6/2012 | Dorenbosch | H04W 72/005 370/241.1 |
| 2012/0244901 | A1* | 9/2012 | Sachs | H04W 72/06 455/509 |
| 2012/0250603 | A1* | 10/2012 | Huang | H04W 72/1257 370/315 |
| 2012/0275391 | A1* | 11/2012 | Cui | H04W 72/1247 370/329 |
| 2012/0282943 | A1* | 11/2012 | Hsiao | H04W 72/082 455/452.2 |
| 2012/0294161 | A1* | 11/2012 | Sunay | H04W 72/1236 370/252 |
| 2013/0003672 | A1* | 1/2013 | Dinan | H04L 1/00 370/329 |
| 2013/0003673 | A1* | 1/2013 | Dinan | H04W 72/0406 370/329 |
| 2013/0010641 | A1* | 1/2013 | Dinan | H04W 36/0072 370/254 |
| 2013/0012211 | A1* | 1/2013 | Sander | H04W 36/0022 455/438 |
| 2013/0091248 | A1* | 4/2013 | Viswanathan | H04W 72/1236 709/219 |
| 2013/0148597 | A1* | 6/2013 | Lee | H04W 72/1226 370/329 |
| 2013/0208591 | A1* | 8/2013 | Larsen | H04L 63/0281 370/230 |
| 2013/0322413 | A1* | 12/2013 | Pelletier | H04W 72/1289 370/336 |
| 2013/0343296 | A1* | 12/2013 | Dinan | H04W 76/02 370/329 |
| 2015/0215796 | A1* | 7/2015 | Gustafsson | H04W 24/10 455/405 |
| 2016/0073413 | A1* | 3/2016 | Abrahams | H04L 5/006 370/329 |

OTHER PUBLICATIONS

Y. Zaki, T. Weerawardane, C. Gorg and A. Timm-Giel, "Multi-QoS-Aware Fair Scheduling for LTE," Vehicular Technology Conference (VTC Spring), 2011 IEEE 73rd, Yokohama, 2011, pp. 1-5. doi: 10.1109/VETECS.2011.5956352.*

3GPP Technical Specification Group Radio Access Network, "Evolved Universal Terrestrial Radio Access (E-UTRA) and Evolved Universal Terrestrial Radio Access Network (E-UTRAN): Radio Interface Protocol Aspects", 3GPP TR 25.813 v7.1.0, 2006.*

3rd Generation Partnership Project; Technical Specification Group Radio Access Network; Evolved Universal Terrestrial Radio Access (E-UTRA); Physical layer procedures (Release 9):3GPP TS 36.213 V9.3.0 (Sep. 2010).*

"3rd Generation Partnership Project; Technical Specification Group Services and System Aspects; Policy and charging control architecture (Release 8)", 3GPP TS 23.203 V8.11.0, Sep. 29, 2010, pp. 1-115.

Yasir Zaki et al., "Multi-QoS-Aware Fair Scheduling for LTE", Vehicular Technology Conference (VTC SPRING), 2011 73rd, IEEE, May 15, 2011, pp. 1-5.

International Search Report of PCT/EP2013/053324 dated Apr. 24, 2013 [PCT/ISA/210].

* cited by examiner

METHOD AND A SYSTEM FOR SCHEDULING THE DOWNLINK IN LONG TERM EVOLUTION (LTE) NETWORKS BASED ON QUALITY OF SERVICE (QOS)

CROSS REFERENCE TO RELATED APPLICATIONS

This is a National Stage of International Application No. PCT/EP2013/053324 filed Feb. 20, 2013, claiming priority based on Spanish Patent Application No. P 201230296 filed Feb. 28, 2012, the contents of all of which are incorporated herein by reference in their entirety.

FIELD OF THE ART

The present invention generally relates to a method for scheduling the downlink in Long Term Evolution (LTE) networks based on Quality of Service (QoS), said method by providing a packet scheduling for user terminals and achieving the corresponding QoS requirements according to the 3GPP specifications.

A second aspect of the invention relates to a system arranged to implement the method of the first aspect.

PRIOR STATE OF THE ART

Long-Term Evolution (LTE) is the next step in cellular 3G systems, which represents basically an evolution of present mobile communications standards, such as UMTS and GSM. It constitutes the radio access part of Evolved UMTS, a 3GPP standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. The term LTE encompasses the evolution of the radio access through the Evolved-UTRAN (E-UTRAN). LTE is accompanied by an evolution of the non-radio aspects under the term System Architecture Evolution (SAE) which includes the Evolved Packet Core (EPC) network. Together LTE and SAE comprise the Evolved Packet System (EPS).

Packet scheduling plays an essential role as part of the radio resource management to increase the performance of LTE networks. The strategy to be adopted in LTE DL schedulers is not defined by any standard: new and proprietary solutions are continuously being investigated by both the industry and the scientific community. Scheduling strategies are in general designed to maximize the number of supported users while providing a minimum Quality of Service (QoS). The context for QoS measurement is defined by 3GPP with the introduction of the so-called EPS bearers [1].

One of the key elements in EPS architecture is the EPS bearer, which represents the equivalent of the PDP context in UMTS core. According to the 3GGP TS 23.203 [1], each EPS bearer is associated with one and only one QoS Class Identifier (QCI). The QCI is a scalar that is used as a reference to node specific parameters that control packet forwarding treatment (e.g. scheduling weights, admission thresholds, queue management thresholds, link layer protocol configuration, etc.) and that have been pre-configured by the operator owning the node (e.g. eNodeB).

The 3GPP specification 23.203 [1] defines a set of 9 standardized QCIs. These standardized QCI values are associated with Quality of Service (QoS) characteristics which describe the packet forwarding treatment of a Service Data Flow (SDF) between the UE and the PCEF in terms of the following performance characteristics:

1. Resource Type (GBR or Non-GBR). It determines if dedicated network resources related to a service or bearer level Guaranteed Bit Rate (GBR) value are permanently allocated.
2. Priority. It shall be used to prioritize between SDF aggregates of the same UE, and it shall also be used to prioritize between SDF aggregates from different UEs.
3. Packet Delay Budget (PDB). The Packet Delay Budget (PDB) defines an upper bound for the time that a packet may be delayed between the UE and the PCEF.
4. Packet Error Loss Rate (PELR). The Packet Error Loss Rate (PELR) defines an upper bound for the rate of SDUs (e.g. IP packets) that have been processed by the sender of a link layer protocol (e.g. RLC in E UTRAN) but that are not successfully delivered by the corresponding receiver to the upper layer (e.g. PDCP in E UTRAN).

According to [1], these standardized characteristics are not signaled on any interface. They should be understood as guidelines for the pre-configuration of node specific parameters for each QCI. The one-to-one mapping of standardized QCI values to standardized characteristics is captured in Table 1 extracted from [1].

TABLE 1

One-to-one mapping of standardized QCI values to standardized characteristics from 3GPP TS 23.203

| QCI | Resource Type | Priority | Packet Delay Budget (NOTE 1) | Packet Error Loss Rate (NOTE 2) | Example Services |
|---|---|---|---|---|---|
| 1 (NOTE 3) | GBR | 2 | 100 ms | $10^{-2}$ | Conversational Voice |
| 2 (NOTE 3) | | 4 | 150 ms | $10^{-3}$ | Conversational Video (Live Streaming) |
| 3 (NOTE 3) | | 3 | 50 ms | $10^{-3}$ | Real Time Gaming |
| 4 (NOTE 3) | | 5 | 300 ms | $10^{-6}$ | Non-Conversational Video (Buffered Streaming) |
| 5 (NOTE 3) | Non-GBR | 1 | 100 ms | $10^{-6}$ | IMS Signalling |
| 6 | | | | | Video (Buffered Streaming) |

TABLE 1-continued

One-to-one mapping of standardized QCI values to standardized characteristics from 3GPP TS 23.203

| QCI | Resource Type | Priority | Packet Delay Budget (NOTE 1) | Packet Error Loss Rate (NOTE 2) | Example Services |
|---|---|---|---|---|---|
| (NOTE 4) | | 6 | 300 ms | $10^{-6}$ | TCP-based (e.g., www, e-mail, chat, ftp, p2p file sharing, progressive video, etc.) |
| 7 (NOTE 3) | | 7 | 100 ms | $10^{-3}$ | Voice, Video (Live Streaming) Interactive Gaming |
| 8 (NOTE 5) | | 8 | 300 ms | $10^{-6}$ | Video (Buffered Streaming) TCP-based (e.g., www, e-mail, chat, ftp, p2p file sharing, progressive video, etc.) |
| 9 (NOTE 6) | | 9 | | | |

NOTE 1:
A delay of 20 ms for the delay between a PCEF and a radio base station should be subtracted from a given PDB to derive the packet delay budget that applies to the radio interface. This delay is the average between the case where the PCEF is located "close" to the radio base station (roughly 10 ms) and the case where the PCEF is located "far" from the radio base station, e.g. in case of roaming with home routed traffic (the one-way packet delay between Europe and the US west coast is roughly 50 ms). The average takes into account that roaming is a less typical scenario. It is expected that subtracting this average delay of 20 ms from a given PDB will lead to desired end-to-end performance in most typical cases. Also, note that the PDB defines an upper bound. Actual packet delays - in particular for GBR traffic - should typically be lower than the PDB specified for a QCI as long as the UE has sufficient radio channel quality.
NOTE 2:
The rate of non congestion related packet losses that may occur between a radio base station and a PCEF should be regarded to be negligible. A PELR value specified for a standardized QCI therefore applies completely to the radio interface between a UE and radio base station.
NOTE 3:
This QCI is typically associated with an operator controlled service, i.e., a service where the SDF aggregate's uplink/downlink packet filters are known at the point in time when the SDF aggregate is authorized. In case of E-UTRAN this is the point in time when a corresponding dedicated EPS bearer is established/modified.
NOTE 4:
If the network supports Multimedia Priority Services (MPS) then this QCI could be used for the prioritization of non real-time data (i.e. most typically TCP-based services/applications) of MPS subscribers.
NOTE 5:
This QCI could be used for a dedicated "premium bearer" (e.g. associated with premium content) for any subscriber/subscriber group. Also in this case, the SDF aggregate's uplink/downlink packet filters are known at the point in time when the SDF aggregate is authorized. Alternatively, this QCI could be used for the default bearer of a UE/PDN for "premium subscribers".
NOTE 6:
This QCI is typically used for the default bearer of a UE/PDN for non privileged subscribers. Note that AMBR can be used as a "tool" to provide subscriber differentiation between subscriber groups connected to the same PDN with the same QCI on the default bearer.

The usage of the different QCIs allows operators to differentiate packet forwarding treatment in the network to the different services (HTTP, FTP, conversational voice, video, etc.). The usage of these QCIs and the mapping of services on to QCIs is a decision of the operator.

Particular relevance for the eNodeB scheduling is the Priority parameter. At this respect, the 3GPP specification indicates the following: Scheduling between different SDF aggregates shall primarily be based on the PDB. If the target set by the PDB can no longer be met for one or more SDF aggregate(s) across all UEs that have sufficient radio channel quality then Priority shall be used as follows: in this case a scheduler shall meet the PDB of an SDF aggregate on Priority level N in preference to meeting the PDB of SDF aggregates on Priority level N+1 until the priority N SDF aggregate's GBR (in case of a GBR SDF aggregate) has been satisfied.

Therefore, in order to meet the 3GPP specifications, novel scheduling techniques based on the compliment of the above defined QCI parameters are encouraged.

Problems with Existing Solutions

There exist a wide variety of scheduling solutions for the downlink of the LTE system. However, the majority of them are generic scheduling algorithms that do not take into account the QoS requirements of the different services. These generic algorithms are usually based on variations of the so-called Proportional Fair scheduler (PF). PF scheduler does not take into account any QoS requirement, basing its decisions upon the instantaneous channel quality as well as the average throughput. However a few solutions provide certain QoS guarantees, presenting also several drawbacks:

- The solution in [2] provides a scheduler for the downlink of LTE that decouples the time and frequency domains. This solution is intended to carry best effort traffic and services that require a Guaranteed Bit Rate. The Guaranteed Bit Rate is satisfied by means of the Time Domain Packet Scheduler.
- The solution in [3] considers different QoS classes and two different QoS classifications (Guaranteed Bit Rate and non-Guaranteed Bit Rate). This proposal applies a differentiated scheduling treatment to each QoS class.
- The solution US 20056917812 presents an invention with different utility functions, each one oriented towards a particular criterion (delay, throughput, scheduling fairness). They consider user-class distinction through differentiated utility functions for different user classes, selecting at each moment the users with the most favourable metric value.

While solutions [2] and [3] take into account some QoS parameters and traffic differentiation, they do not guarantee the satisfaction of the QoS characteristics as specified by 3GPP specifications (in particular [1]). The invention US 20056917812 has the drawback of not providing a true prioritization of the users' classes, as they are only distinguished by some bias included in the corresponding utility functions, while not really dealing with the compliance of the QCI parameters described in Table 1.

SUMMARY OF THE INVENTION

It is necessary to offer an alternative to the state of the art which covers the gaps found therein, particularly those related to the lack of proposals which allow the application of scheduling techniques for the downlink of the LTE networks that satisfies the QoS characteristics as specified by 3GPP TS 23.203 [1].

To that end, the present invention, in a first aspect, provides a packet scheduling method based on QoS for the downlink of the LTE networks, said packet scheduling method comprising performing a packet scheduling for a plurality of user terminals (UEs) based on information regarding QoS classes.

On contrary to the known proposals, the method of the invention, in a characteristic manner comprises receiving said information regarding QoS classes from said user terminals, included in QoS class identifiers received from an Evolved Packet Core providing communication services to said user terminals, maximizing the number of users which fulfil said QoS parameters in the network.

The method further comprising receiving channel quality indicators from said plurality of user terminals and performing said scheduling also on the basis of said received channel quality indicators. The method also comprises performing said packet scheduling assuring that the delay upper bound stated by the Packet Delay Budget is not exceeded for none of the user terminals and in case the delay upper bound it cannot be assured, also comprises performing a prioritization between said packets on the basis of said priority class identifier.

In what follows the terms "bearer" and "user" are employed interchangeably for simplicity throughout the text, although in practice a user may set up more than one bearer. People skilled in the art can however make the necessary changes in the description so as to refer to specific bearers for each user, without departure from the ideas presented in this invention.

For an embodiment, said packet scheduling performs the next scheduling strategies:
  a) a scheduling rule for GBR bearers;
  b) a scheduling rule for non-GBR bearers supporting a delay-dependent traffic; and
  c) a scheduling rule for other non-GBR bearers supporting an elastic traffic.

Other embodiments of the method of the first aspect of the invention are described herein, and in a subsequent section related to the detailed description of several embodiments.

A second aspect of the invention concerns to a system for scheduling the downlink in Long Term Evolution (LTE) networks based on Quality of Service (QoS), comprising:
  a plurality of user terminals; and
  a packet scheduler configured for performing a packet scheduling for said plurality of user terminals based on information regarding QoS classes.
On contrary to known systems for scheduling the downlink in Long Term Evolution (LTE) networks, the system of the second aspect of the invention further comprises an Evolved Packet Core providing communication services to said user terminals and configured for sending QoS class identifiers, including said information regarding QoS classes, to said packet scheduler, and in that said packet scheduler is configured for using said received QoS class identifiers for performing said packet scheduling aimed at maximizing the number of users fulfilling said QoS parameters.

The system of the second aspect on the invention is arranged to implement the method of the first aspect.

Other embodiments of the system of the first aspect of the invention are described herein, and in a subsequent section related to the detailed description of several embodiments.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
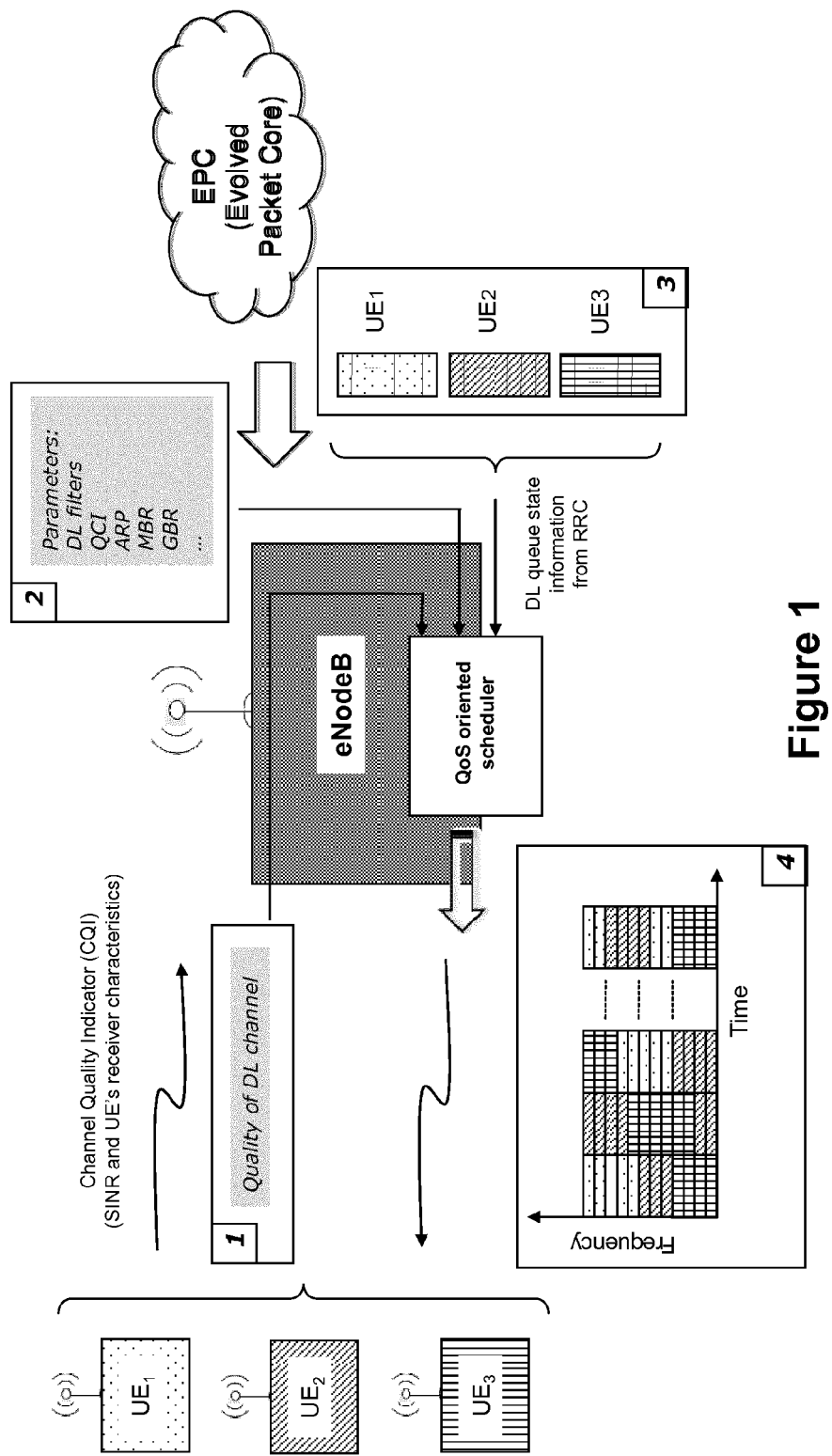
FIG. 1 shows the basic concept of the packet scheduling solution based on QoS for LTE networks, according to an embodiment of the present invention.

The present invention presents a new scheduling method for LTE networks meeting the corresponding QoS requirements according to the 3GPP specifications.

The proposal for the overall scheduling design includes the following parts:
  A scheduling proposal for GBR bearers that aims at guaranteeing them a packet delay budget (PDB).
  A scheduling proposal for non-GBR bearers that support delay-dependent traffic (e.g. IMS signalling, voice, video, live streaming, interactive gaming, etc.). This proposal aims at guaranteeing them a packet delay budget (PDB).
  A scheduling proposal for non-GBR bearers for elastic traffic (e.g. www, e-mail, ftp, progressive video, etc.). This proposal aims at providing these bearers a minimum data rate.
  An integration mechanism that aims at combining the different scheduling disciplines for GBR and non-GBR bearers using the relative priority of the QCIs and their QoS. If the capacity is not sufficient to achieve the QoS requirements for all the bearers in the cell, the integration mechanism will meet the QoS requirements of bearers with higher priority at the expenses of bearers with lower priority.

Additionally, a semi-persistent scheduling that reserves certain Resource Blocks for bearers mapped on to conversational QCIs can be applied (e.g. QCI 1 for conversational voice), although this is not part of the current invention.

Proposal for GBR Bearers

This proposal is intended for flows mapped on GBR QCIs except QCI 1, i.e. except conversational voice (which could utilize a semi-persistent scheduling). It is based on the Log Rule scheduler [4] with a modified function to compute the flow priority, allowing a better control of the packet delay.

The scheduling proposal for GBR bearers computes the priority in every Resource Block k and TTI n as:

$$P_i[n, k] = \left(\text{offset} + 2 \times \text{priorityAtTarget} \times \frac{1}{1 + e^{-a \cdot (W_i[n] - TQ_{QCI_m})}}\right) \times \frac{R_i[n, k]}{r_i[n]}$$

where Pi[n,k] denotes the priority of user i on Resource Block k and TTI n, $R_i[n,k]$ is the instantaneous supported data rate of user i on the Resource Block k and on TTI n, $r_i[n]$ is the low-pass filtered data rate that the user i has received until TTI n, offset stands for the minimum priority, priorityAtTarget is the priority achieved (plus offset) when the quality performance metric is equal to its target, $W_i[n]$ is the delay of the Head of Line (HOL) packet of user i on TTI n, $TQ_{QCI\_m}$, is the target delay for bearers of QCI m (i.e. the PDB of QCI m) and a is a constant.

It shall be noted that the last factor $$\left(\frac{R_i[n, k]}{r_i[n]}\right)$$

is the priority based on the Proportional Fair scheduler, whereas the fraction with the exponential takes into account the packet delay and its target value.

The constants in the equation above are parameters that can be selected to optimize performance. Nevertheless, the following values are proposed:

The minimum priority shall be equal to 1× the Proportional Fair (PF) factor, i.e. offset=1.

The priority when the HOL packet delay is equal to the PDB of QCI m shall be higher (e.g. ×2.5) than the priority of other services when they have very low performance. Assuming for example $r_i[n]$=100 kbps as a worst case for best effort traffic flows, and $R_i[n,k]$=40 Mbps/50 RBs at most, then $$\frac{R_i[n, k]}{r_i[n]} \leq \frac{40.000 \ kbps/50 \ RBs}{100 \ kbps} = 8.$$

Then, one can select priorityAtTarget=8×2.5=20 so this QCI will have much higher priority than best-effort QCIs when its performance is poor.

The priority should be stable and low (e.g. near the PF factor) if the HOL packet delay is far from its target. When the HOL packet delay is near the target, it should increase rapidly to priorityAtTarget×the PF factor. Finally, if the HOL packet delay is higher than its target, the priority should increase further. However, after a certain value over its target, the priority should be very high but stable in order to avoid one user pre-empting all the resources and causing the starvation of other users. With all these considerations, a suitable value could be a=35.

However any other values are also possible, provided that the proposed scheme is followed.

Proposal for Non-GBR Bearers that Support Delay Dependent Traffic

For bearers mapped on to QCIs that support delay-dependent traffic, it is proposed to apply the same scheduling method proposed for GBR bearers. As in the case of GBR bearers, it aims at guaranteeing the QCI's Packet Delay Budget.

For these non-GBR bearers the MBR is supposed to be controlled by the PDN-GW, e.g. using a Token Bucket shaper for each bearer.

Proposal for Non-GBR Bearers that Support Elastic Traffic

For bearers mapped on to QCIs that support elastic traffic, it is proposed to simply apply the Proportional Fair scheduler that provides an interesting trade-off between spectral efficiency and fairness.

For each Resource Block k and TTI n, the user with the highest priority is selected for transmitting. The priority of each user (with data to transmit) is computed (in every Resource Block k and TTI n) as:

$$P_i[n, k] = \frac{R_i[n, k]}{r_i[n]}$$

Proposal for Integration of the Different Schedulers

It is required to integrate the previous proposals of scheduling strategies, which differ for different QCIs, into a single solution. It should be noted that semi-persistent scheduling for QCI 1 (conversational voice) is left outside this integration.

The present invention proposes that the integration is based on the Priority parameter of the standardized QCI characteristics of each QCI. According to [1], the Priority parameter should be understood in the following way:

"If the target set by the PDB can no longer be met for one or more SDF aggregate(s) across all UEs that have sufficient radio channel quality then Priority shall be used as follows: in this case a scheduler shall meet the PDB (Packet Delay Budget) of SDF aggregates on Priority level N in preference to meeting the PDB of SDF aggregates on Priority level N+1".

As it is difficult to guarantee a Packet Delay Budget for bearers that support elastic traffic, this invention proposes to slightly modify the criterion:

"If the target set by the PDB can no longer be met for one or more SDF aggregate(s) across all UEs that have sufficient radio channel quality then Priority shall be used as follows: in this case a scheduler shall meet the Quality Criterion of SDF aggregates on Priority level N in preference to meeting the Quality Criterion of SDF aggregates on Priority level N+1".

Based on the previous criterion, it is proposed to define a quality performance indicator $Q_i$ for each bearer, and, additionally, a target quality $TQ_{QCI\_m}$ that establishes the minimum quality level that should perceive a bearer mapped onto QCI m:

QCIs carrying delay-dependent services (e.g. traffic mapped on GBR bearers, IMS signalling, voice, video, live streaming, interactive gaming, etc.): $Q_i$ is a KPI measuring the delay, it is recommended to apply a low pass filtered version, but any suitable delay estimation is valid for the present invention, experienced by the packets of the bearer i; $TQ_{QCI\_m}$ is proposed to be the Packet Delay Budget for QCI m.

QCIs carrying elastic services (e.g. www, e-mail, ftp, progressive video, etc): $Q_i$ is a KPI measuring the throughput, it is recommended to apply a low pass filtered version, but any suitable throughput estimation is valid for the present invention, experienced by the bearer i; $TQ_{QCI\_m}$ is proposed to be a minimum data rate for QCI m.

Based on the quality performance target metric $TQ_{QCI\_m}$, it is further proposed to define a metric $Q_{QCI\_m}$ as:

QCIs carrying delay-dependent services: the highest $Q_i$ across all the bearers that correspond to QCI m and that "have sufficient radio channel quality". A UE could be considered to have "sufficient radio channel quality" if his RSRP and RSRQ measurements are above predetermined thresholds, but other criteria are also possible.

QCIs carrying best-effort services: the lowest $Q_i$ across all the bearers that correspond to QCI m and that "have sufficient radio channel quality".

$Q_{QCI\_m}$ measures the performance of the bearer with worst quality among all bearers with QCI m.

Based on the $Q_{QCI\_m}$ metric, it is proposed to modify the priority of a user i mapped onto QCI m by multiplying it by a factor $F_m$, which is the same for all the users of QCI m. And the new priority of the bearer i is given by the expression:

$$P_i^{QCI_m}[n,k] = P_i[n,k] \times F_m$$

Figure 2:
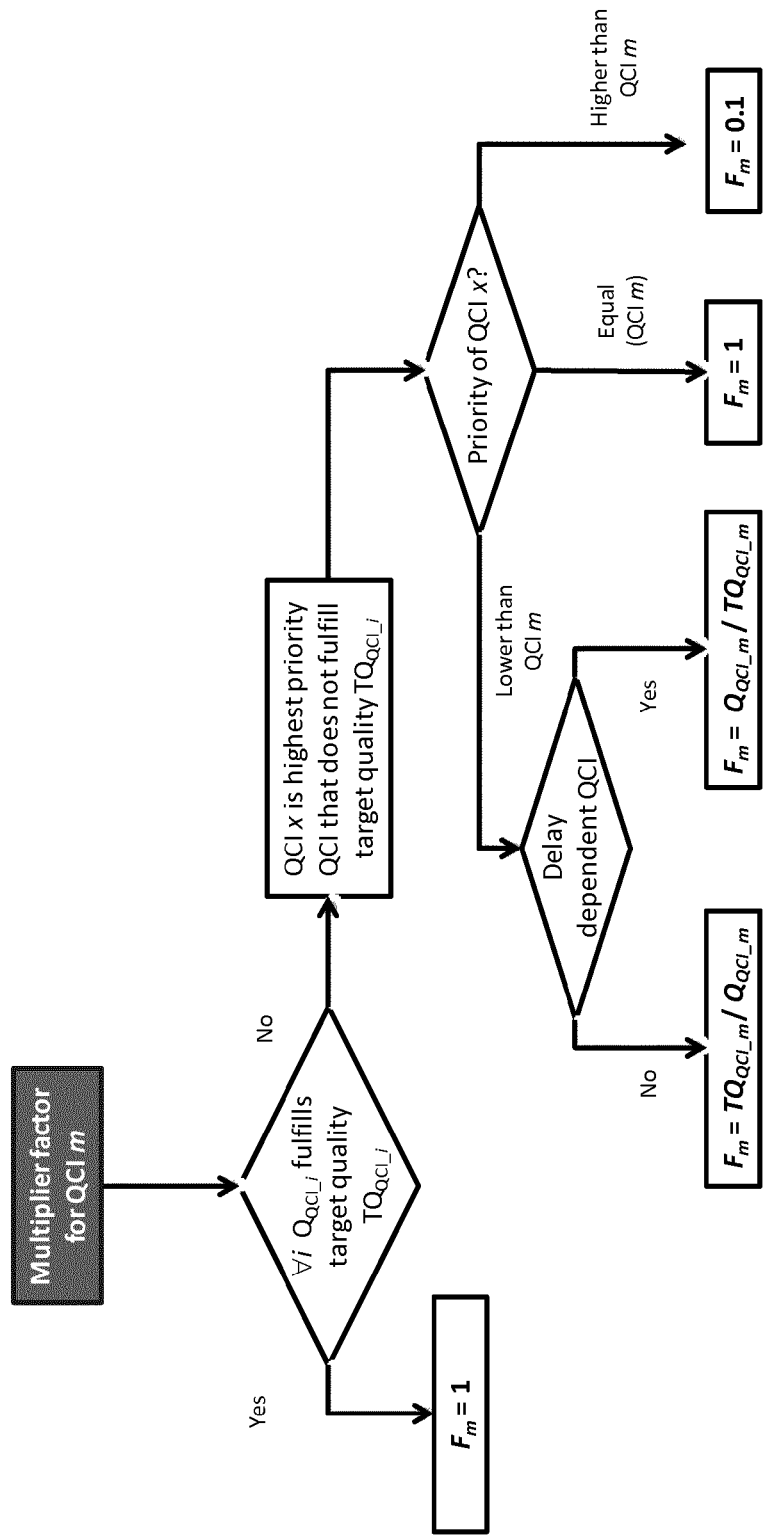
FIG. 2 shows the flowchart to compute the multiplying factor $F_m$, according to an embodiment of the present invention.

The proposed factor aims at modifying the bearer priorities according to their quality metrics. There are many alternatives for computing the multiplier factor Fm. One such possibility is depicted in FIG. 2, which considers only UEs with sufficient radio channel quality according to any suitable criteria. Any other strategy that takes into account the relative fulfillments of the above defined target qualities will also be considered appropriate for the proposed invention.

The proposed procedure for selecting the factor $F_m$ for QCI m is as follows. If all QCIs fulfill their corresponding target quality levels, the factor is equal to one. Otherwise, the decision depends on the highest priority QCI which does not fulfill its target quality (with sufficient radio channel quality), namely QCI x as explained below.

If the priority of QCI x is higher than QCI m (as stated by the Priority parameter criterion), this factor will highly reduce the priority of bearer i from QCI m in order to leave some resources for that user. A possible value of $F_m=0.1$ is proposed in this case, not precluding any other implementation-dependent values.

If its priority is lower, the factor for delay-dependent bearers is equal to:

$$F_m = \frac{Q_{QCI_m}}{TQ_{QCI_m}},$$

and for not delay-dependent bearers is equal to $$F_m = \frac{TQ_{QCI_m}}{Q_{QCI_m}}$$

These factors get values higher than one when the target is not fulfilled (be it throughput or delay), otherwise they are lower than one. Thus it helps to slightly boost QCI m when its target is not fulfilled, but otherwise it leaves resources for the less priority QCI x.

When the priority of QCI x is equal to that of QCI m, the factor is equal to one. Finally, the integration proposal will serve on every TTI n and every Resource Block k the bearer u that fulfills:

$$u(k) = \underset{i}{\operatorname{argmax}}\{P_i^{QCI_m}[n,k]\}$$

where u(k) represents that resource block k should be assigned to bearer u.

Simulation Results

In order to test the proposed scheduling method, it has been implemented in the downlink of a LTE quasi-dynamic network simulator. Its main parameters and assumptions are presented in Table 2. The following services are tested as an example: YouTube, Web browsing and FTP, but other services are not precluded in the present invention (especially GBR services).

TABLE 2

Main parameters for the LTE dynamic simulations

| Parameter | Setting |
|---|---|
| Carrier frequency | 2 GHz |
| System bandwidth | 10 MHz |
| Duplexing scheme | FDD |
| Resource block bandwidth | 180 KHz |
| Sub-carriers per resource block | 12 |
| Sub-frame duration | 1 ms |
| Inter-site distance | 2 km |
| Std of shadow fading | 8 dB |
| Power delay profile | ITU Typical urban 20 paths |
| Antenna receiver scheme | 2 - rx (Maximal ratio combining) |
| UE speed for fast fading process | 3 km/h |
| Total eNode-B transmit power | 46 dBm |
| Pilot, control channel overhead | 3/14 symbols |
| Modulation/coding rate settings | QPSK (R = 1/3, 1/2, 2/3) |
| | 16 QAM (R = 1/2, 2/3, 4/5) |
| | 64 QAM (R = 2/3, 4/5) |
| CQI signalling delay | 1 ms |
| Error in CQI estimation | Ideal CQI estimation |
| CQI reporting period | 1 ms |
| Outer loop link adaptation | disabled (ideal CQI estimation) |
| HARQ model | Ideal chase combining |
| Number of stop and wait processes | 6 |
| User data rate low-pass filter length | 300 ms |
| Threshold for enough radio channel quality (G factor) | −3 dB |
| Number of web pages per session | 1 |
| Mean offered cell load | 12 Mbps |

As suggested by Table 1, QCI 6 is reserved for YouTube, QCI 8 for Web browsing and QCI 9 for FTP (best-effort) traffic. Priority is thus ranked higher for YouTube, lower for Web Browsing and finally the lowest for FTP.

Users are only simulated in the central cell of a hexagonal grid of 13 cells. The remaining cells transmit a constant power and are only a source of interference. Users do not vary their geographical location with time, and therefore, their deterministic path loss and shadow fading remains invariable during the lifetime of the user. However, users experience a fast fading process that is updated in each Transmission Time Interval (TTI) based on the ITU Typical Urban (TU) power delay profile. A Single Input Multiple Output (SIMO) configuration with two receiving antennas is considered, and it is modeled with ideal Maximal Ratio Combining (MRC) at the receiver. The simulator provides a Geometry Factor (G-Factor) distribution that accurately fits the results for macro-cell outdoor scenario presented in [5]. The link-to-system level mapping is based on the Exponential Effective SIR Metric (EESM) model [6].

Users are created according to a Poisson process whose mean offered cell load is controlled by a simulation parameter.

The YouTube progressive video download has been implemented following the model described in [8]. For convergence reasons, the video duration was limited to 120 seconds. The video encoding rate followed the distribution described in [7]. A simplified web browsing model [7] is included: every user downloads a single page in every web browsing session. The web browsing session is terminated as soon as the download is completed and the user dies afterwards. For simplicity reasons, the effects of TCP and HTTP are not included, and every web page is assumed to be a single payload (located at the eNodeB) of size 2 MB. Similarly, the FTP sessions have been modelled using a fixed value for the file size (1 MB).

A cell load of 12 Mbps (high to load) is considered, and a PDB of 300 ms for YouTube bearers.

Baseline Results (Proportional Fair, Non-Qos Oriented Scheduler)

Figure 3:
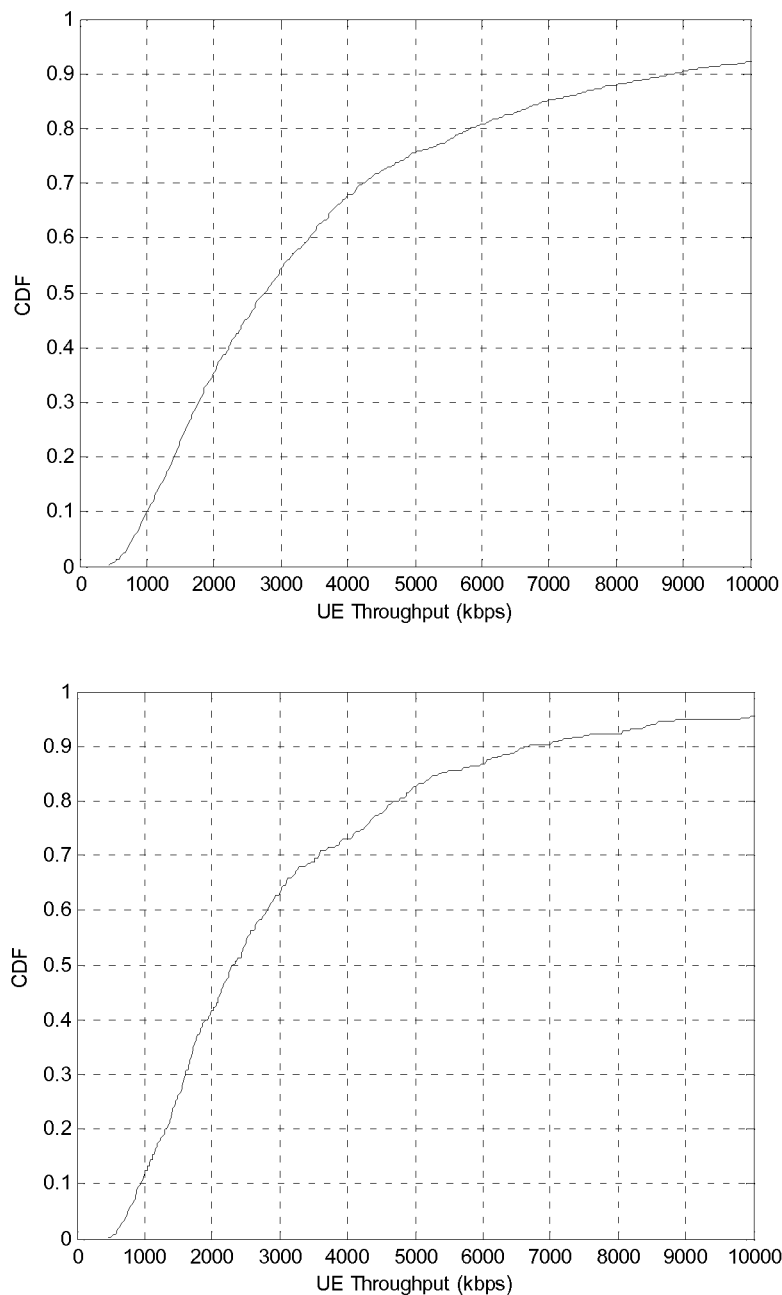
FIG. 3 shows an example of the results of the UE throughput distribution for Web and FTP applying a Proportional Fair scheduler not considering QoS aspects.
Figure 4:
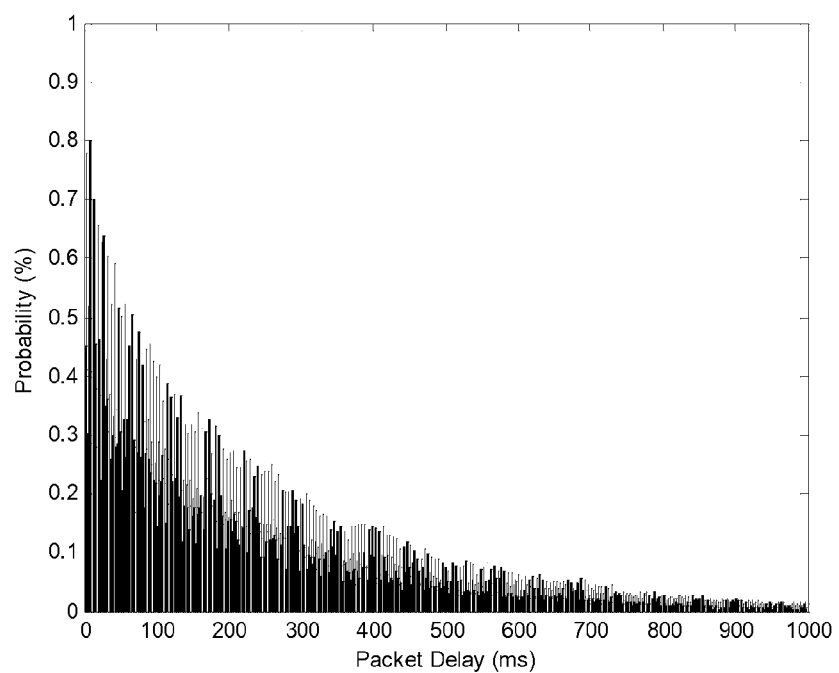
FIG. 4 shows an example of the results of the Packet delay for YouTube traffic flows applying a Proportional Fair scheduler not considering QoS aspects.

The results with a conventional Proportional Fair scheduler not considering QoS aspects are presented in FIGS. 3 and 4.

It can be seen that the throughput distributions for Web and FTP users are almost equal, because no QoS differentiation is provided with a PF scheduler (both are considered as best-effort).

It is also apparent that YouTube users experience a delay which is essentially unbounded. If a PDB of 300 ms is considered as indicated in Table 1 for QCI 6 (progressive video), then the actual delay clearly exceeds this value for a significant proportion of users. This originates playback pauses and hence a degraded quality of experience.

Results with the proposed QoS-oriented scheduler, PDB (YouTube)=300 ms

Figure 5:
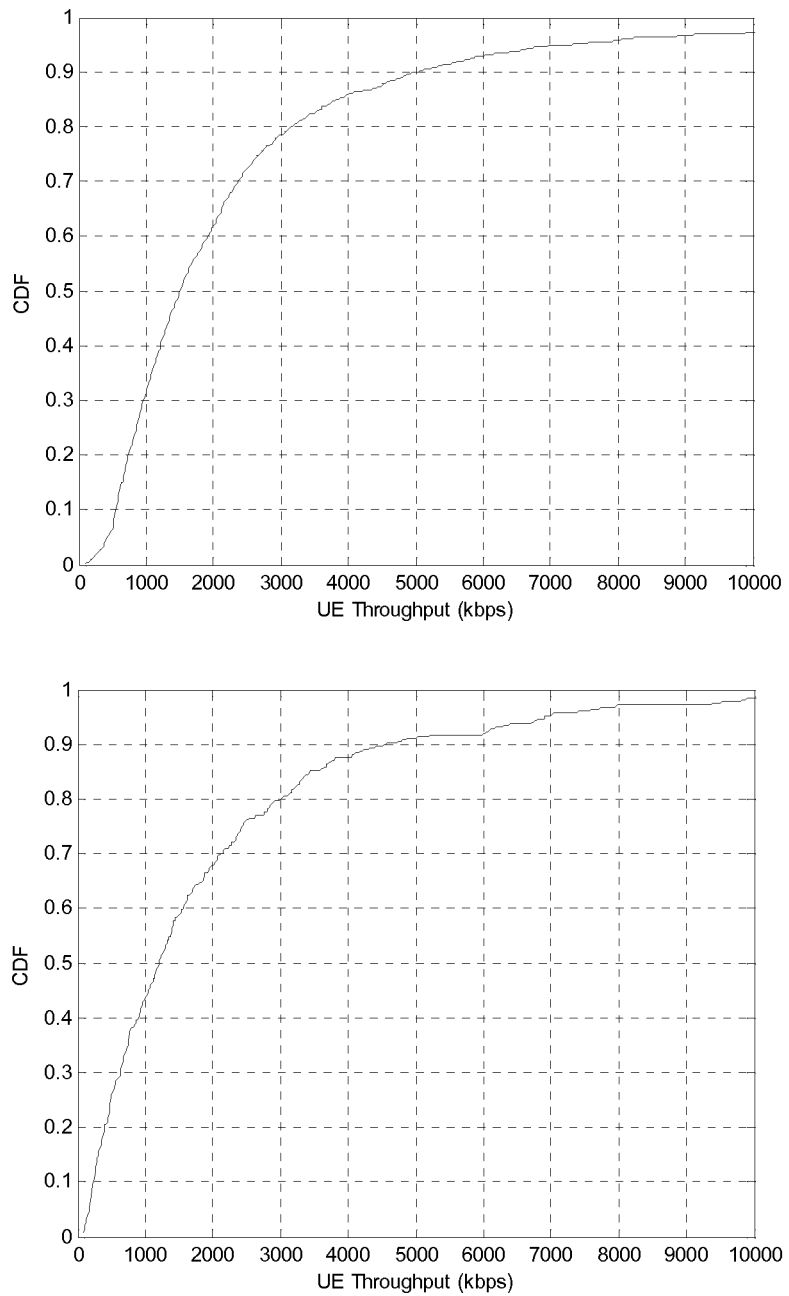
FIG. 5 shows the results of the UE throughput distribution for Web and FTP applying the proposed QoS-oriented scheduler, according to an embodiment of the present invention.
Figure 6:
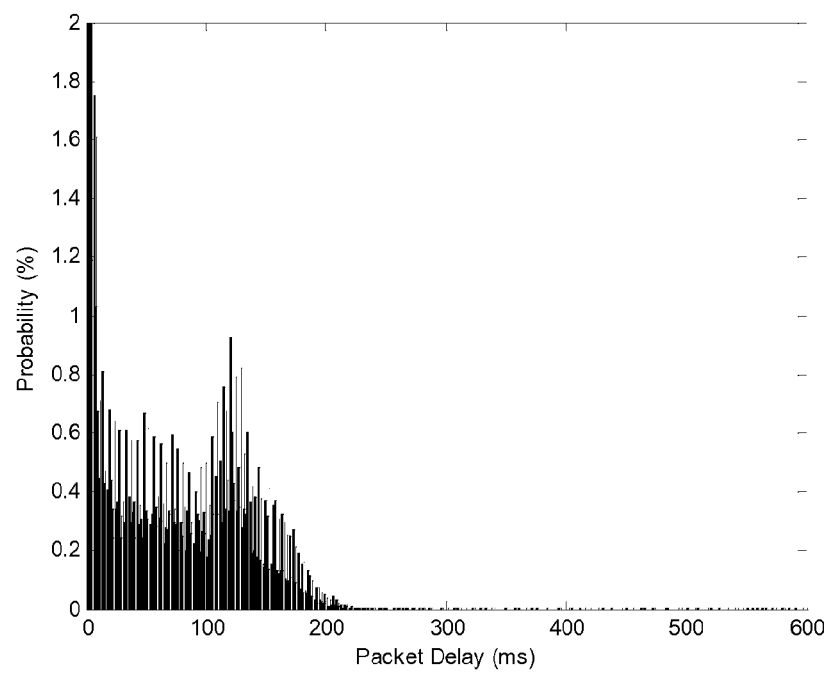
FIG. 6 shows the results of the Packet delay for YouTube traffic flows applying the proposed QoS-oriented scheduler, according to an embodiment of the present invention.

FIGS. 5 and 6 represent the corresponding results applying the scheduler described in the proposed invention.

FIG. 6 shows that the YouTube delay in this case is clearly below the 300 ms target. YouTube traffic flows are treated with a higher priority, thus depriving Web and FTP users of some resources. This is appreciated in FIG. 5 when comparing with the PF solution in FIG. 3: the throughput distribution is slightly shifted to the left in the former case, as some of their resources are allocated for video users. The gain in performance for YouTube is clearly worth the loss in throughput for elastic traffic.

A use case of this invention is a Long Term Evolution radio access network consisting of eNodeBs that implement a Packet Scheduler to serve different bearers. The operator maps the traffic from the different services on to the corresponding bearers according to its predefined policies by making use of the QCI parameter. An example of service mapping on to QCIs has been provided in the introduction.

Figure 7:
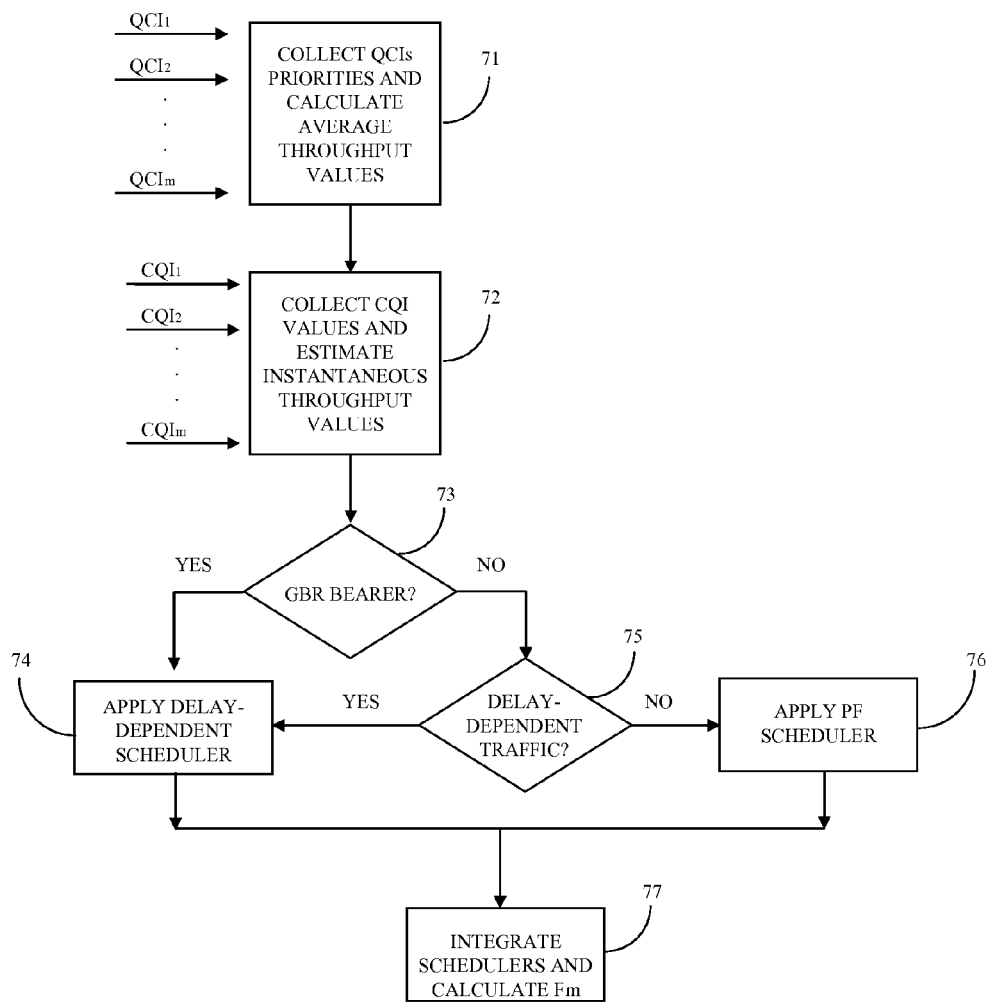
FIG. 7 shows an exemplary embodiment of the proposed scheduling solution that illustrates the constituent parts of the present invention.

FIG. 7 shows an exemplary embodiment that illustrates the constituent parts of the described invention, but other possibilities are not precluded depending on actual implementation needs. This embodiment should be located at the eNodeB and may consist of a combination of software, hardware or firmware elements. Block (71) collects the different QCIs describing the data flows present in the cell, each one with a different priority as specified by the Priority parameter in the QCI, and calculates the average, low-pass filtered throughput values needed in the scheduling decisions. Block (72) also collects the appropriate CQI (Channel Quality Indicator) values expressing the instantaneous channel quality as experienced by each user, and estimates the corresponding instantaneous throughput values. If a GBR bearer is considered (block 73), the delay-dependent scheduler described in the present invention is applied (block 74); otherwise actions depend on the type of traffic (block 75). Delay-dependent data flows are also managed with the delay-dependent scheduler in block (74); otherwise a conventional Proportional Fair scheduler is applied in block (76). Finally an integration of the different schedulers with their appropriate $F_m$ factors is accomplished in block (77).

Advantages of the Invention

The technical advantages of the proposed scheduling solution, compared to other approaches, are:
  The proposed scheduler for GBR bearers, and for non-GBR bearers that support delay-dependent traffic, is able to guarantee a Packet Delay Budget thus fulfilling QoS criteria defined in 3GPP [1].
  If there are not sufficient resources to fulfil the QoS criterion for all bearers, the proposed scheduling solution is able to guarantee the minimum quality target (Packet Delay Budget for bearers that support delay-dependent services or Minimum Data Rate for bearers that support elastic traffic) of higher priority QCIs at the expenses of the lowest priority QCIs. Therefore prioritization of services is achieved according to the recommendations given by 3GPP in [1].
Furthermore, the proposed invention allows to enhance users' quality of experience resulting in better cell throughput values and hence the possibility to increase revenue.

ACRONYMS

3G Third Generation
3GPP Third Generation Partnership Project
AMBR Aggregate Maximum Bit Rate
CQI Channel Quality Indicator
DL Downlink
EESM Exponential Effective SINR Metric
EPC Evolved Packet Core
EPS Evolved Packet System
E-UTRAN Enhanced Universal Terrestrial Radio Access Network
FDD Frequency Division Duplex
FTP File Transmission Protocol
GBR Guaranteed Bit Rate
GSM Global System for Mobile Communications
HARQ Hybrid Automatic Repeat Request
HOL Head of Line
HTTP Hyper Text Transfer Protocol
IMS IP Multimedia Subsystem
IP Internet Protocol
ITU International Telecommunications Union
KPI Key Performance Indicator
LTE Long Term Evolution
MBR Maximum Bit Rate
MRC Maximum Ratio Combining
MPS Multimedia Priority Services
PCEF Policy Control Enforcement Function
PDB Packet Delay Budget
PDCP Packet Data Convergence Protocol
PDN-GW Packet Data Network Gateway
PDP Packet Data Protocol PELR Packet Error Loss Rate
PF Proportional Fair
QCI QoS Class Identifier
QoS Quality of Service
RLC Radio Link Control
RSRP Reference Signal Received Power
RSRQ Reference Signal Received Quality
SAE System Architecture Evolution
SDF Service Data Flow
SDU Service Data Unit
SIMO Single Input Multiple Output
TCP Transmission Control Protocol
TS Technical Specification
TTI Transmission Time Interval
TU Typical Urban
UE User Equipment
UMTS Universal Mobile Telecommunication System
UTRAN Universal Terrestrial Radio Access Network
WWW World Wide Web

REFERENCES

[1] 3GPP TS 23.203 V8.11.0. 3rd Generation Partnership Project; Technical Specification Group Services and System Aspects; Policy and charging control architecture (Release 8).
[2] G. Monghal et al. "QoS Oriented Time and Frequency Domain Packet Schedulers for the UTRAN Long Term Evolution", Proceedings of the 67th IEEE Vehicular Technology Conference (VTC '08), pp. 2532-2536, May 2008.
[3] Y. Zaki et al. "Multi-QoS-aware Fair Scheduling for LTE", in 2011 IEEE 73rd Vehicular Technology Conference: VTC2011-Spring, Budapest, Hungary, May 15-18, 2011.
[4] Bilal Sadiq, Seung Jun Baek, and Gustavo de Veciana, "Delay-Optimal Opportunistic Scheduling and Approximations: The Log Rule", IEEE/ACM Transactions on Networking, April 2011.
[5] N. Wei et al, "Baseline E-UTRA Downlink Spectral Efficiency Evaluation," Vehicular Technology Conference, 2006. VTC 2006-Fall, pp. 1-5, September 2006.
[6] Y. Blankenship et al, "Link Error Prediction Methods for Multicarrier Systems," Vehicular Technology Conference, 2004. VTC 2004-Fall, vol. 6, pp. 4175-4179, 26-29 Sep. 2004.
[7] Pablo Ameigeiras, Juan J. Ramos-Munoz, Jorge Navarro-Ortiz, Preben Mogensen, Juan M. Lopez-Soler, "QoE oriented cross-layer design of a resource allocation algorithm in beyond 3G systems," Computer Communications, vol. 33, pp. 571-582, 2010.
[8] Pablo Ameigeiras, Juan J. Ramos-Munoz, Jorge Navarro-Ortiz, Jose A. Zamora-Cobo, Juan M. Lopez-Soler, "Analysis and Modeling of the YouTube Traffic", submitted on August 2011 to Elsevier's Computer Communications journal (pending acceptance).

The invention claimed is:

1. A method for scheduling downlink in a radio access network based on a Quality of Service (QoS), the method comprising: performing a packet scheduling for a plurality of user equipments (UEs) based on information regarding QoS classes, the information regarding the QoS classes being included in QoS class identifiers received from an Evolved Packet Core (EPC) providing communication services to the UEs, wherein the QoS class identifiers comprise at least two of a resource type, including Guaranteed Bit Rate (GBR) and Non-GBR bearer, a priority, a Packet Delay Budget, and a Packet Error Loss Rate, and wherein the packet scheduling maximizes a number of the UEs fulfilling QoS parameters in the radio access network, by performing steps comprising:

defining a quality performance indicator $Q_i$ and a target quality $TQ_{QCI\_m}$ for each of the QoS classes, the quality performance indicator $Q_i$ including the information regarding the QoS classes with a packet delay for delay-dependent services or data rate for elastic services, and the target quality $TQ_{QCI\_m}$ including the information regarding the QoS classes with a Packet Delay Budget for the delay-dependent services or a minimum data rate for the elastic services;

defining a metric $Q_{QCI\_m}$ that depends on a type of services that are carried including delay-dependent or best-effort services for each one of the QoS classes measuring if performance of the number of UEs fulfills a quality performance target of the UEs;

including a factor in a priority of a UE mapped onto a QoS class supporting a delay-dependent traffic, the factor comprising $$\text{offset} + 2 \times priorityAtTarget \times \frac{1}{1+e^{-a\left(W_i[n]-TQ_{QCIm}\right)}}$$

and the factor being multiplied by $$\left(\frac{R_i[n,k]}{r_i[n]}\right),$$

wherein the priority of the UE is defined by a product of the above two factors, and where:
offset stands for a minimum priority,
priorityAtTarget is a priority achieved considering the offset when the $Q_{QCI\_m}$ metric is equal to its target,
$W_i[n]$ is a delay of a Head of Line (HOL) packet of the UE on Transmission Time Interval (TTI) n,
$TQ_{QCI\_m}$ is the target quality,
a is a constant,
$R_i[n,k]$ is an instantaneous supported data rate of a user i on a Resource Block k and on TTI n, and
$r_i[n]$ is a low-pass filtered data rate that the user i has received until TTI n;
modifying the priority of the UE by multiplying the priority by a factor $F_m$ that considers a relative priority of the QoS class identifiers and a degree of fulfillment of the quality performance indicator $Q_i$ with respect to the target quality $TQ_{QCI\_m}$ for the UEs and the QoS class identifiers, wherein:
$F_m$ is one if all of the QoS class identifiers fulfill their corresponding target quality levels; or
the decision for selecting $F_m$ depends on a highest priority of the QoS class identifiers x which does not fulfill its target quality by considering:
if the priority of the QCI x is higher than the priority of QCI m, then the factor $F_m$ will be much lower than one in order to reduce the priority of the QCI m;
if the priority of the QCI x is lower than the priority of the QCI m, then the factor $F_m$ for delay-dependent bearers is $$F_m = \frac{Q_{QCl_m}}{TQ_{QCl_m}},$$

and
for not delay-dependent bearers is $$F_m = \frac{TQ_{QCl_m}}{Q_{QCl_m}};$$

if the priority of the QCI x is equal to the priority of the QCI m, then the factor $F_m$ is equal to one; and combining scheduling strategies for the number of UEs of the QoS classes supporting the delay-dependent traffic and an elastic traffic by fulfilling:

$$u(k) = \underset{i}{\mathrm{argmax}}\{P_i^{QCl_m}[n,k]\}$$

where:
$P_i^{QCl_m}$ is a modified priority, and
u(k) represents a resource block k that should be assigned to a bearer u.

2. The method of claim 1, further comprising receiving channel quality indicators from the plurality of user terminals and performing the packet scheduling also based on the received channel quality indicators.

3. The method of claim 1, further comprising performing the packet scheduling assuring that a delay upper bound stated by the Packet Delay Budget is not exceeded for any of the UEs.

4. The method of claim 3, further comprising, in response to not being able to assure that the delay upper bound is not exceeded for any of the UEs, performing a prioritization between the packets, regarding the packet scheduling, based on the QoS class identifier.

5. The method of claim 1, further comprising performing the packet scheduling by following scheduling strategies comprising:
a) a scheduling rule for GBR bearers;
b) a scheduling rule for non-GBR bearers supporting a delay-dependent traffic; and
c) a scheduling rule for other non-GBR bearers supporting an elastic traffic.

6. The method of claim 5, wherein the rule for GBR bearers of the steps a) and b) guarantees the GBR bearers a Packet Delay Budget.

7. The method of claim 6, wherein the rule for other non-GBR bearers of the step c) guarantees that the non-GBR bearers are provided with a minimum data rate.

8. The method of claim 7, further comprising combining the scheduling strategies for the GBR and the non-GBR bearers using a relative priority of the QoS class identifiers.

9. The method of claim 8, wherein the combination of the scheduling strategies is based on a priority parameter of the standardized QoS class identifiers characteristics of each of the QoS class identifiers.

10. The method of claim 9, further comprising guaranteeing a minimum quality target of a higher priority of the QoS class identifiers.

11. The method of claim 10, further comprising defining a quality performance indicator $Q_i$ for each of the bearers, and a target quality $TQ_{QCI\_m}$ for establishing a minimum quality level.

12. The method of claim 11, wherein a factor $F_m$ is defined for modifying the bearers priorities according to the target quality metrics.

13. A system for scheduling downlink in a radio access networks based on Quality of Service (QoS), the system comprising:
a plurality of user equipments (UEs);
a packet scheduler configured to perform a packet scheduling for the plurality of UEs based on information regarding QoS classes; and
an Evolved Packet Core (EPC) architecture configured to provide communication services to the UEs, and configured to send QoS class identifiers, including the information regarding QoS classes, to the packet scheduler,
wherein in the system the packet scheduler is configured to use the received QoS class identifiers, the QoS class identifiers comprising at least two of a resource type, including Guaranteed Bit Rate (GBR) and Non-GBR bearer, a priority, a Packet Delay Budget, and a Packet Error Loss Rate, and is configured to maximize a number of the UEs fulfilling QoS parameters in the radio access network, by:
defining a quality performance indicator $Q_i$ and a target quality $TQ_{QCI\_m}$ for each of the QoS classes, the quality performance indicator $Q_i$ including the information regarding the QoS classes with a packet delay for delay-dependent services or data rate for elastic services and the target quality $TQ_{QCI\_m}$ including the information regarding the QoS classes with a Packet Delay Budget for the delay-dependent services or a minimum data rate for the elastic services;
defining a metric $Q_{QCI\_m}$ that depends on a type of services that are carried including delay-dependent or best-effort services for each one of the QoS classes measuring if performance of the number of UEs fulfills a quality performance target of the UEs;
including a factor in a priority of a UE mapped onto a QoS class supporting a delay-dependent traffic, the factor comprising $$\mathrm{offset} + 2 \times \mathit{priorityAtTarget} \times \frac{1}{1+e^{-a\left(W_i[n]-TQ_{QCl_m}\right)}}$$

and the factor being multiplied by $$\left(\frac{R_i[n,k]}{r_i[n]}\right),$$

wherein the priority of the UE is defined by a product of the above two factors, and where:
offset stands for a minimum priority,
priorityAtTarget is a priority achieved considering the offset when the $Q_{QCI\_m}$ metric is equal to its target,
$W_i[n]$ is a delay of a Head of Line (HOL) packet of the UE on Transmission Time Interval (TTI) n,
$TQ_{QCI\_m}$ is the target quality,
a is a constant,
$R_i[n,k]$ is an instantaneous supported data rate of a user i on a Resource Block k and on TTI n, and
$r_i[n]$ is a low-pass filtered data rate that the user i has received until TTI n;
modifying the priority of the UE by multiplying the priority by a factor $F_m$ that considers a relative priority of the QoS class identifiers and a degree of fulfillment of the quality performance indicator $Q_i$ with respect to the target quality $TQ_{QCI\_m}$ for the UEs and the QoS class identifiers, wherein:

$F_m$ is one if all of the QoS class identifiers fulfill their corresponding target quality levels; or the decision for selecting $F_m$ depends on a highest priority of the QoS class identifiers x which does not fulfill its target quality by considering:

if the priority of the QCI x is higher than the priority of QCI m, then the factor $F_m$ will be much lower than one in order to reduce the priority of the QCI m;

if the priority of the QCI x is lower than the priority of the QCI m, then the factor $F_m$ for delay-dependent bearers is $$F_m = \frac{Q_{QCI_m}}{TQ_{QCI_m}},$$

and
for not delay-dependent bearers is $$F_m = \frac{TQ_{QCI_m}}{Q_{QCI_m}};$$

if the priority of the QCI x is equal to the priority of the QCI m, then the factor $F_m$ is equal to one; and combining scheduling strategies for the number of UEs of the QoS classes supporting the delay-dependent traffic and an elastic traffic, by fulfilling:

$$u(k) = \underset{i}{\operatorname{argmax}}\{P_i^{QCI_m}[n, k]\}$$

where:

$P_i^{QCI_m}$ is a modified priority, and u(k) represents a resource block k that should be assigned to a bearer u.

14. The system of claim 13, wherein the packet scheduler is a delay-dependent scheduler for the GBR and for the non-GBR supporting the delay-dependent traffic.

15. The system of claim 13, wherein the packet scheduler is a Proportional Fair scheduler for the non-GBR supporting the elastic traffic.

16. The system of claim 13, wherein the packet scheduler is located at the eNodeB.

\* \* \* \* \*